United States Patent
Drummond et al.

(10) Patent No.: US 8,686,840 B2
(45) Date of Patent: *Apr. 1, 2014

(54) ACCESSORY SYSTEM FOR A VEHICLE

(71) Applicant: Magna Electronics Inc., Auburn Hills, MI (US)

(72) Inventors: John P. Drummond, Glenageary (IE); Niall R. Lynam, Holland, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,835

(22) Filed: Jan. 25, 2013

(65) Prior Publication Data

US 2013/0138301 A1 May 30, 2013

Related U.S. Application Data

(63) Continuation of application No. 13/276,655, filed on Oct. 19, 2011, now Pat. No. 8,362,885, which is a continuation of application No. 12/693,720, filed on Jan. 26, 2010, now Pat. No. 8,044,777, which is a continuation of application No. 11/764,559, filed on Jun. 18, 2007, now Pat. No. 7,679,488, which is a continuation of application No. 11/288,649, filed on Nov. 29, 2005, now Pat. No. 7,233,230, which is a continuation of application No. 10/694,595, filed on Oct. 27, 2003, now Pat. No. 6,970,073, which is a continuation of application No. 10/134,716, filed on Apr. 29, 2002, now Pat. No. 6,639,519, which is a continuation of application No. 09/820,013, filed on Mar. 28, 2001, now Pat. No. 6,396,408.

(60) Provisional application No. 60/196,577, filed on Mar. 31, 2000.

(51) Int. Cl.
*B60Q 1/00* (2006.01)
*B60C 23/02* (2006.01)
*G02B 5/04* (2006.01)

(52) U.S. Cl.
USPC ............... 340/425.5; 340/815.4; 348/143; 362/494; 307/10.1

(58) Field of Classification Search
USPC ............... 340/425.5; 362/494; 348/148
See application file for complete search history.

(56) References Cited

U.S. PATENT DOCUMENTS 2,414,223 A 1/1947 De Virgilis
3,870,404 A 3/1975 Wilson et al.
(Continued)

FOREIGN PATENT DOCUMENTS

DE 3525672 1/1987
DE 3605704 8/1987
(Continued)

OTHER PUBLICATIONS

"Combination of rain sensing, autolamps and telephone antenna in one module," Research Disclosure, Kenneth Mason Publications, Hampshire, GB No. 412, Aug. 1998, p. 1045XP-000824825.

(Continued)

*Primary Examiner* — Donnie Crosland
(74) *Attorney, Agent, or Firm* — Gardner, Linn, Burkhart & Flory, LLP

(57) ABSTRACT

An accessory system for a vehicle includes an accessory disposed at and behind a windshield of the vehicle and a control having digital circuitry and a microcontroller. The accessory includes a forward facing camera that views through the windshield. The microcontroller may control at least one of (i) the forward facing camera, (ii) an actuator of the vehicle, (iii) a garage door opener of the vehicle, (iv) an electro-optic rearview mirror assembly of the vehicle, (v) a digital sound processor of the vehicle, (vi) a display of the vehicle and (vii) lighting of the vehicle. The control is operable to at least one of send data to and receive data from at least one other accessory or system of the vehicle via a vehicle network of the vehicle.

44 Claims, 3 Drawing Sheets

(56) References Cited

U.S. PATENT DOCUMENTS

| | | |
|---|---|---|
| 4,065,750 A | 12/1977 | Duncan et al. |
| 4,254,931 A | 3/1981 | Aikens et al. |
| 4,274,078 A | 6/1981 | Isobe et al. |
| 4,286,305 A | 8/1981 | Pilat et al. |
| 4,443,057 A | 4/1984 | Bauer et al. |
| 4,580,875 A | 4/1986 | Bechtel et al. |
| 4,646,210 A | 2/1987 | Skogler et al. |
| 4,646,673 A | 3/1987 | Fordyce |
| 4,712,879 A | 12/1987 | Lynam et al. |
| 4,733,336 A | 3/1988 | Skogler et al. |
| 4,760,497 A | 7/1988 | Roston |
| 4,768,135 A | 8/1988 | Kretschmer et al. |
| 4,781,436 A | 11/1988 | Armbruster |
| 4,793,690 A | 12/1988 | Gahan et al. |
| 4,807,096 A | 2/1989 | Skogler et al. |
| 4,859,867 A | 8/1989 | Larson et al. |
| 4,863,130 A | 9/1989 | Marks, Jr. |
| 4,871,917 A | 10/1989 | O'Farrell et al. |
| 4,886,960 A | 12/1989 | Molyneux et al. |
| 4,891,559 A | 1/1990 | Matsumoto et al. |
| 4,895,097 A | 1/1990 | Lechnir |
| 4,916,374 A | 4/1990 | Schierbeek et al. |
| 4,917,477 A | 4/1990 | Bechtel et al. |
| 4,930,742 A | 6/1990 | Schofield et al. |
| 4,936,533 A | 6/1990 | Adams et al. |
| 4,937,945 A | 7/1990 | Schofield et al. |
| 4,953,305 A | 9/1990 | Van Lente et al. |
| 4,956,591 A | 9/1990 | Schierbeek et al. |
| 4,967,319 A | 10/1990 | Seko |
| 4,973,844 A | 11/1990 | O'Farrell et al. |
| 5,058,851 A | 10/1991 | Lawlor et al. |
| 5,066,112 A | 11/1991 | Lynam et al. |
| 5,073,012 A | 12/1991 | Lynam |
| 5,076,673 A | 12/1991 | Lynam et al. |
| 5,076,674 A | 12/1991 | Lynam |
| 5,096,287 A | 3/1992 | Kakinami et al. |
| 5,100,095 A | 3/1992 | Haan et al. |
| 5,115,346 A | 5/1992 | Lynam |
| 5,140,455 A | 8/1992 | Varaprasad et al. |
| 5,142,407 A | 8/1992 | Varaprasad et al. |
| 5,145,609 A | 9/1992 | Varaprasad et al. |
| 5,151,816 A | 9/1992 | Varaprasad et al. |
| 5,151,824 A | 9/1992 | O'Farrell |
| 5,178,448 A | 1/1993 | Adams et al. |
| 5,189,537 A | 2/1993 | O'Farrell |
| 5,193,029 A | 3/1993 | Schofield et al. |
| 5,204,778 A | 4/1993 | Bechtel |
| 5,208,701 A | 5/1993 | Maeda |
| 5,239,405 A | 8/1993 | Varaprasad et al. |
| 5,239,406 A | 8/1993 | Lynam |
| 5,245,422 A | 9/1993 | Borcherts et al. |
| 5,253,109 A | 10/1993 | O'Farrell et al. |
| 5,255,442 A | 10/1993 | Schierbeek et al. |
| 5,264,997 A | 11/1993 | Hutchisson et al. |
| 5,266,873 A | 11/1993 | Arditi et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,327,288 A | 7/1994 | Wellington et al. |
| 5,329,206 A | 7/1994 | Slotkowski et al. |
| 5,330,149 A | 7/1994 | Haan et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| D351,370 S | 10/1994 | Lawlor et al. |
| 5,355,118 A | 10/1994 | Fukuhara |
| 5,355,245 A | 10/1994 | Lynam |
| 5,361,190 A | 11/1994 | Roberts et al. |
| 5,371,659 A | 12/1994 | Pastrick et al. |
| 5,374,852 A | 12/1994 | Parkes |
| 5,377,949 A | 1/1995 | Haan et al. |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,865 A | 6/1995 | Lynam |
| 5,424,952 A | 6/1995 | Asayama |
| 5,426,294 A | 6/1995 | Kobayashi et al. |
| 5,430,431 A | 7/1995 | Nelson |
| 5,432,496 A | 7/1995 | Lin |
| 5,434,407 A | 7/1995 | Bauer et al. |
| 5,439,305 A | 8/1995 | Santo |
| 5,440,428 A | 8/1995 | Hegg et al. |
| 5,444,478 A | 8/1995 | Lelong et al. |
| 5,446,576 A | 8/1995 | Lynam et al. |
| 5,451,822 A | 9/1995 | Bechtel et al. |
| 5,455,716 A | 10/1995 | Suman et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,366 A | 12/1995 | Van Lente et al. |
| 5,475,494 A | 12/1995 | Nishida et al. |
| 5,487,522 A | 1/1996 | Hook |
| 5,488,352 A | 1/1996 | Jasper |
| 5,497,306 A | 3/1996 | Pastrick |
| 5,498,866 A | 3/1996 | Bendicks et al. |
| 5,500,760 A | 3/1996 | Varaprasad et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,521,760 A | 5/1996 | DeYoung et al. |
| 5,523,877 A | 6/1996 | Lynam |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,566,224 A | 10/1996 | Azam et al. |
| 5,567,360 A | 10/1996 | Varaprasad et al. |
| 5,568,027 A | 10/1996 | Teder |
| 5,570,127 A | 10/1996 | Schmidt |
| 5,572,354 A | 11/1996 | Desmond et al. |
| 5,574,443 A | 11/1996 | Hsieh |
| 5,576,687 A | 11/1996 | Blank et al. |
| 5,581,464 A | 12/1996 | Woll et al. |
| 5,582,383 A | 12/1996 | Mertens et al. |
| 5,587,236 A | 12/1996 | Agrawal et al. |
| 5,594,222 A | 1/1997 | Caldwell |
| 5,609,652 A | 3/1997 | Yamada et al. |
| 5,610,756 A | 3/1997 | Lynam et al. |
| 5,611,966 A | 3/1997 | Varaprasad et al. |
| 5,614,788 A | 3/1997 | Mullins |
| 5,615,857 A | 4/1997 | Hook |
| 5,619,370 A | 4/1997 | Guinosso |
| 5,631,638 A | 5/1997 | Kaspar et al. |
| 5,632,551 A | 5/1997 | Roney et al. |
| 5,634,709 A | 6/1997 | Iwama |
| 5,642,299 A | 6/1997 | Hardin et al. |
| 5,648,835 A | 7/1997 | Uzawa |
| 5,649,756 A | 7/1997 | Adams et al. |
| 5,650,944 A | 7/1997 | Kise |
| 5,654,686 A | 8/1997 | Geschke et al. |

(56) References Cited

U.S. PATENT DOCUMENTS

| | | |
|---|---|---|
| 5,659,423 A | 8/1997 | Schierbeek et al. |
| 5,660,454 A | 8/1997 | Mori et al. |
| 5,661,303 A | 8/1997 | Teder |
| 5,661,455 A | 8/1997 | Van Lente et al. |
| 5,666,028 A | 9/1997 | Bechtel et al. |
| 5,666,157 A | 9/1997 | Aviv |
| 5,668,663 A | 9/1997 | Varaprasad et al. |
| 5,669,698 A | 9/1997 | Veldman et al. |
| 5,669,705 A | 9/1997 | Pastrick et al. |
| 5,670,935 A | 9/1997 | Schofield et al. |
| 5,671,996 A | 9/1997 | Bos et al. |
| 5,677,851 A | 10/1997 | Kingdon et al. |
| 5,680,245 A | 10/1997 | Lynam |
| 5,689,241 A | 11/1997 | Clarke, Sr. et al. |
| 5,691,848 A | 11/1997 | Van Lente et al. |
| 5,699,044 A | 12/1997 | Van Lente et al. |
| 5,703,568 A | 12/1997 | Hegyi |
| 5,708,410 A | 1/1998 | Blank et al. |
| 5,708,743 A | 1/1998 | DeAndrea et al. |
| 5,724,187 A | 3/1998 | Varaprasad et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,774,283 A | 6/1998 | Nagel et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,796,176 A | 8/1998 | Kramer et al. |
| 5,798,575 A | 8/1998 | O'Farrell et al. |
| 5,798,688 A | 8/1998 | Schofield |
| 5,808,777 A | 9/1998 | Lynam et al. |
| 5,820,097 A | 10/1998 | Spooner |
| 5,820,245 A | 10/1998 | Desmond et al. |
| 5,825,283 A | 10/1998 | Camhi |
| 5,835,255 A | 11/1998 | Miles |
| 5,837,891 A | 11/1998 | Bridge |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,863,116 A | 1/1999 | Pastrick et al. |
| 5,864,419 A | 1/1999 | Lynam |
| 5,867,591 A | 2/1999 | Onda |
| 5,871,275 A | 2/1999 | O'Farrell et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,910,854 A | 6/1999 | Varaprasad et al. |
| 5,914,815 A | 6/1999 | Bos |
| 5,923,027 A | 7/1999 | Stam et al. |
| 5,926,087 A | 7/1999 | Busch et al. |
| 5,929,786 A | 7/1999 | Schofield et al. |
| 5,940,120 A | 8/1999 | Frankhouse et al. |
| 5,940,503 A | 8/1999 | Palett et al. |
| 5,947,586 A | 9/1999 | Weber |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,006,159 A | 12/1999 | Schmier et al. |
| 6,008,486 A | 12/1999 | Stam et al. |
| 6,019,411 A | 2/2000 | Carter et al. |
| 6,019,475 A | 2/2000 | Lynam et al. |
| 6,020,704 A | 2/2000 | Buschur |
| 6,028,537 A | 2/2000 | Suman et al. |
| 6,049,171 A | 4/2000 | Stam et al. |
| 6,056,410 A | 5/2000 | Hoekstra et al. |
| 6,066,933 A | 5/2000 | Ponziana |
| 6,068,380 A | 5/2000 | Lynn et al. |
| 6,084,519 A | 7/2000 | Coulling et al. |
| 6,087,012 A | 7/2000 | Varaprasad et al. |
| 6,087,942 A | 7/2000 | Sleichter, III et al. |
| 6,087,953 A | 7/2000 | DeLine et al. |
| 6,089,721 A | 7/2000 | Schierbeek |
| 6,097,023 A | 8/2000 | Schofield et al. |
| 6,097,024 A | 8/2000 | Stam et al. |
| 6,097,027 A | 8/2000 | Eadington et al. |
| 6,099,131 A | 8/2000 | Fletcher et al. |
| 6,100,798 A | 8/2000 | Liang |
| 6,108,084 A | 8/2000 | Winner |
| 6,116,743 A | 9/2000 | Hoek |
| 6,124,647 A | 9/2000 | Marcus et al. |
| 6,124,886 A | 9/2000 | DeLine et al. |
| 6,130,421 A | 10/2000 | Bechtel et al. |
| 6,139,172 A | 10/2000 | Bos et al. |
| 6,144,022 A | 11/2000 | Tenenbaum et al. |
| 6,151,065 A | 11/2000 | Steed et al. |
| 6,154,306 A | 11/2000 | Varaprasad et al. |
| 6,158,655 A | 12/2000 | DeVries, Jr. et al. |
| 6,166,625 A | 12/2000 | Teowee et al. |
| 6,166,698 A | 12/2000 | Turnbull et al. |
| 6,170,955 B1 | 1/2001 | Campbell et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,198,087 B1 | 3/2001 | Boon |
| 6,198,409 B1 | 3/2001 | Schofield et al. |
| 6,201,642 B1 | 3/2001 | Bos |
| 6,207,083 B1 | 3/2001 | Varaprasad et al. |
| 6,207,967 B1 | 3/2001 | Hochstein |
| 6,210,008 B1 | 4/2001 | Hoekstra et al. |
| 6,217,181 B1 | 4/2001 | Lynam et al. |
| 6,222,447 B1 | 4/2001 | Schofield et al. |
| 6,222,460 B1 | 4/2001 | DeLine et al. |
| 6,229,226 B1 | 5/2001 | Kramer et al. |
| 6,229,434 B1 | 5/2001 | Knapp et al. |
| 6,243,003 B1 | 6/2001 | DeLine et al. |
| 6,245,262 B1 | 6/2001 | Varaprasad et al. |
| 6,250,148 B1 | 6/2001 | Lynam |
| 6,255,639 B1 | 7/2001 | Stam et al. |
| 6,259,359 B1 | 7/2001 | Fujinami et al. |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,276,821 B1 | 8/2001 | Pastrick et al. |
| 6,278,377 B1 | 8/2001 | DeLine et al. |
| 6,285,393 B1 | 9/2001 | Shimoura et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,315 B2 | 10/2001 | Hoekstra et al. |
| 6,299,316 B1 | 10/2001 | Fletcher et al. |
| 6,299,319 B1 | 10/2001 | Mertens et al. |
| 6,302,545 B1 | 10/2001 | Schofield et al. |
| 6,305,807 B1 | 10/2001 | Schierbeek |

(56) References Cited

U.S. PATENT DOCUMENTS

| | | |
|---|---|---|
| 6,310,611 B1 | 10/2001 | Caldwell |
| 6,313,454 B1 | 11/2001 | Bos et al. |
| 6,317,057 B1 | 11/2001 | Lee |
| 6,318,697 B1 | 11/2001 | Corrado et al. |
| 6,320,176 B1 | 11/2001 | Schofield et al. |
| 6,320,282 B1 | 11/2001 | Caldwell |
| 6,323,477 B1 | 11/2001 | Blasing et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,333,759 B1 | 12/2001 | Mazzilli |
| 6,340,849 B1 | 1/2002 | Kramer et al. |
| 6,340,850 B2 | 1/2002 | O'Farrell et al. |
| 6,341,013 B1 | 1/2002 | Battiti et al. |
| 6,341,523 B2 | 1/2002 | Lynam |
| 6,353,392 B1 | 3/2002 | Schofield et al. |
| 6,362,771 B1 | 3/2002 | Schofield et al. |
| 6,366,213 B2 | 4/2002 | DeLine et al. |
| 6,370,329 B1 | 4/2002 | Teuchert |
| 6,379,013 B1 | 4/2002 | Bechtel et al. |
| 6,386,742 B1 | 5/2002 | DeLine et al. |
| 6,392,218 B1 | 5/2002 | Kuehnle |
| 6,396,408 B2 | 5/2002 | Drummond et al. |
| 6,406,152 B1 | 6/2002 | Hoekstra et al. |
| 6,412,973 B1 | 7/2002 | Bos et al. |
| 6,420,036 B1 | 7/2002 | Varaprasad et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,447,124 B1 | 9/2002 | Fletcher et al. |
| 6,452,148 B1 | 9/2002 | Bendicks et al. |
| 6,465,904 B2 | 10/2002 | O'Farrell et al. |
| 6,466,136 B2 | 10/2002 | DeLine et al. |
| 6,472,979 B2 | 10/2002 | Schofield et al. |
| 6,474,820 B1 | 11/2002 | Hoekstra et al. |
| 6,477,464 B2 | 11/2002 | McCarthy et al. |
| 6,483,438 B2 | 11/2002 | DeLine et al. |
| 6,496,117 B2 | 12/2002 | Gutta et al. |
| 6,498,620 B2 | 12/2002 | Schofield et al. |
| 6,498,967 B1 | 12/2002 | Hopkins et al. |
| 6,501,387 B2 | 12/2002 | Skiver et al. |
| 6,513,252 B1 | 2/2003 | Schierbeek et al. |
| 6,515,378 B2 | 2/2003 | Drummond et al. |
| 6,516,664 B2 | 2/2003 | Lynam |
| 6,522,451 B1 | 2/2003 | Lynam |
| 6,545,598 B1 | 4/2003 | De Villeroche |
| 6,547,404 B2 | 4/2003 | Schierbeek |
| 6,555,804 B1 | 4/2003 | Blasing |
| 6,564,122 B1 | 5/2003 | Huertgen et al. |
| 6,567,708 B1 | 5/2003 | Bechtel et al. |
| 6,587,573 B1 | 7/2003 | Stam et al. |
| 6,587,968 B1 | 7/2003 | Leyva |
| 6,593,565 B2 | 7/2003 | Heslin et al. |
| 6,595,649 B2 | 7/2003 | Hoekstra et al. |
| 6,596,978 B2 | 7/2003 | Hochstein |
| 6,603,137 B2 | 8/2003 | Hochstein |
| 6,611,202 B2 | 8/2003 | Schofield et al. |
| 6,614,043 B2 | 9/2003 | Hochstein |
| 6,615,650 B2 | 9/2003 | Mahner |
| 6,617,564 B2 | 9/2003 | Ockerse et al. |
| 6,639,519 B2 | 10/2003 | Drummond et al. |
| 6,642,851 B2 | 11/2003 | DeLine et al. |
| 6,646,359 B2 | 11/2003 | Schaefer et al. |
| 6,648,477 B2 | 11/2003 | Hutzel et al. |
| 6,653,615 B2 | 11/2003 | Bechtel et al. |
| 6,660,360 B2 | 12/2003 | Mertzel et al. |
| 6,672,744 B2 | 1/2004 | DeLine et al. |
| 6,672,745 B1 | 1/2004 | Bauer et al. |
| 6,679,608 B2 | 1/2004 | Bechtel et al. |
| 6,690,268 B2 | 2/2004 | Schofield et al. |
| 6,700,692 B2 | 3/2004 | Tonar et al. |
| 6,717,712 B2 | 4/2004 | Lynam et al. |
| 6,731,071 B2 | 5/2004 | Baarman |
| 6,734,904 B1 | 5/2004 | Boon et al. |
| 6,737,963 B2 | 5/2004 | Gutta et al. |
| 6,738,088 B1 | 5/2004 | Uskolovsky et al. |
| 6,742,904 B2 | 6/2004 | Bechtel et al. |
| 6,742,905 B2 | 6/2004 | Suyama et al. |
| 6,765,480 B2 | 7/2004 | Tseng |
| 6,768,092 B2 | 7/2004 | Sakata |
| 6,774,356 B2 | 8/2004 | Heslin et al. |
| 6,774,810 B2 | 8/2004 | DeLine et al. |
| 6,784,129 B2 | 8/2004 | Seto et al. |
| 6,799,904 B2 | 10/2004 | Schaefer et al. |
| 6,803,574 B2 | 10/2004 | Abel et al. |
| 6,806,485 B2 | 10/2004 | Jackson, Jr. |
| 6,812,645 B2 | 11/2004 | Baarman |
| 6,824,281 B2 | 11/2004 | Schofield et al. |
| 6,825,620 B2 | 11/2004 | Kuennen et al. |
| 6,831,268 B2 | 12/2004 | Bechtel et al. |
| 6,831,288 B1 | 12/2004 | Schmitt et al. |
| 6,832,719 B2 | 12/2004 | DeVries, Jr. et al. |
| 6,841,767 B2 | 1/2005 | Mindl et al. |
| 6,867,510 B2 | 3/2005 | Kramer et al. |
| 6,877,870 B2 | 4/2005 | Krug |
| 6,877,888 B2 | 4/2005 | DeLine et al. |
| 6,889,064 B2 | 5/2005 | Baratono et al. |
| 6,894,619 B1 | 5/2005 | Schmitt et al. |
| 6,904,348 B2 | 6/2005 | Drummond et al. |
| 6,906,632 B2 | 6/2005 | DeLine et al. |
| 6,917,163 B2 | 7/2005 | Baarman |
| 6,924,470 B2 | 8/2005 | Bechtel et al. |
| 6,930,593 B2 | 8/2005 | Crawshaw |
| 6,956,302 B2 | 10/2005 | O'Farrell et al. |
| 6,968,736 B2 | 11/2005 | Lynam |
| 6,970,073 B2 | 11/2005 | Drummond et al. |
| 6,975,215 B2 | 12/2005 | Schofield et al. |
| 6,975,390 B2 | 12/2005 | Mindl et al. |
| 6,980,092 B2 | 12/2005 | Turnbull et al. |
| 6,995,354 B2 | 2/2006 | Hagen et al. |
| 7,004,593 B2 | 2/2006 | Weller et al. |
| 7,016,783 B2 | 3/2006 | Hac et al. |
| 7,041,965 B2 | 5/2006 | Heslin et al. |
| 7,053,761 B2 | 5/2006 | Schofield et al. |
| 7,075,511 B1 | 7/2006 | Mousseau et al. |
| 7,108,409 B2 | 9/2006 | DeLine et al. |
| 7,111,996 B2 | 9/2006 | Seger et al. |
| 7,188,963 B2 | 3/2007 | Schofield et al. |
| 7,195,381 B2 | 3/2007 | Lynam et al. |
| 7,199,767 B2 | 4/2007 | Spero |
| 7,205,524 B2 | 4/2007 | Drummond et al. |
| 7,233,230 B2 | 6/2007 | Drummond et al. |
| 7,242,320 B2 | 7/2007 | Lawlor et al. |
| 7,249,860 B2 | 7/2007 | Kulas et al. |
| 7,255,451 B2 | 8/2007 | McCabe et al. |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,289,037 B2 | 10/2007 | Uken et al. |
| 7,297,932 B2 | 11/2007 | Georgiadis et al. |
| 7,304,680 B2 | 12/2007 | Köhler et al. |
| 7,311,428 B2 | 12/2007 | DeLine et al. |
| 7,322,755 B2 | 1/2008 | Neumann et al. |
| 7,370,983 B2 | 5/2008 | DeWind et al. |
| 7,420,159 B2 | 9/2008 | Heslin et al. |
| 7,438,774 B2 | 10/2008 | Kurfiss et al. |
| 7,446,427 B2 | 11/2008 | Parker et al. |
| 7,460,007 B2 | 12/2008 | Schofield et al. |
| 7,467,883 B2 | 12/2008 | DeLine et al. |
| 7,480,149 B2 | 1/2009 | DeWard et al. |
| 7,490,944 B2 | 2/2009 | Blank et al. |
| 7,497,632 B2 | 3/2009 | Kajino et al. |
| 7,538,316 B2 | 5/2009 | Heslin et al. |
| 7,570,793 B2 | 8/2009 | Lages et al. |
| 7,609,961 B2 | 10/2009 | Park |
| 7,646,889 B2 | 1/2010 | Tsukamoto |
| 7,651,228 B2 | 1/2010 | Skiver et al. |
| 7,657,052 B2 | 2/2010 | Larson et al. |
| 7,658,521 B2 | 2/2010 | DeLine et al. |
| 7,679,488 B2 | 3/2010 | Drummond et al. |
| 7,697,028 B1 | 4/2010 | Johnson |
| 7,719,408 B2 | 5/2010 | DeWard et al. |
| 7,728,721 B2 | 6/2010 | Schofield et al. |

(56) References Cited

U.S. PATENT DOCUMENTS

| | | |
|---|---|---|
| 7,780,137 B2 | 8/2010 | Hansel et al. |
| 7,780,454 B2 | 8/2010 | Baranski |
| 7,811,011 B2 | 10/2010 | Blaesing et al. |
| 7,817,205 B2 | 10/2010 | Schulte et al. |
| 7,837,173 B2 | 11/2010 | Zinser et al. |
| 7,855,353 B2 | 12/2010 | Blaesing et al. |
| 7,855,755 B2 | 12/2010 | Weller et al. |
| 7,860,275 B2 | 12/2010 | Leleve et al. |
| 7,864,981 B2 | 1/2011 | Leleve et al. |
| 7,888,629 B2 | 2/2011 | Heslin et al. |
| 7,889,086 B2 | 2/2011 | Schafer et al. |
| 7,911,356 B2 | 3/2011 | Wohlfahrt et al. |
| 7,914,188 B2 | 3/2011 | DeLine et al. |
| 7,916,009 B2 | 3/2011 | Schofield et al. |
| 7,940,305 B2 | 5/2011 | Adameck |
| 7,965,336 B2 | 6/2011 | Bingle et al. |
| 7,994,471 B2 | 8/2011 | Heslin et al. |
| 8,044,777 B2 | 10/2011 | Drummond et al. |
| 8,051,707 B2 | 11/2011 | Roehr et al. |
| 8,094,002 B2 | 1/2012 | Schofield et al. |
| 8,134,117 B2 | 3/2012 | Heslin et al. |
| 8,179,437 B2 | 5/2012 | Schofield et al. |
| 8,192,095 B2 | 6/2012 | Kortan et al. |
| 8,256,821 B2 | 9/2012 | Lawlor et al. |
| 8,288,711 B2 | 10/2012 | Heslin et al. |
| 8,309,907 B2 | 11/2012 | Heslin et al. |
| 8,325,028 B2 | 12/2012 | Schofield et al. |
| 8,339,453 B2 | 12/2012 | Blake, III et al. |
| 8,362,885 B2 | 1/2013 | Drummond et al. |
| 2002/0075387 A1 | 6/2002 | Janssen |
| 2002/0126457 A1 | 9/2002 | Kameyama |
| 2003/0202249 A1 | 10/2003 | Schierbeek |
| 2004/0047043 A1 | 3/2004 | Hoekstra et al. |
| 2004/0200948 A1 | 10/2004 | Bos et al. |
| 2005/0237385 A1 | 10/2005 | Kosaka et al. |
| 2006/0050018 A1 | 3/2006 | Hutzel et al. |
| 2006/0061008 A1 | 3/2006 | Karner et al. |
| 2007/0132610 A1 | 6/2007 | Guernalec et al. |
| 2007/0235638 A1 | 10/2007 | Backes et al. |
| 2008/0092673 A1 | 4/2008 | Hansel et al. |
| 2010/0208077 A1 | 8/2010 | DeWard et al. |
| 2011/0155874 A1 | 6/2011 | Roehr et al. |
| 2012/0224065 A1 | 9/2012 | Schofield et al. |
| 2012/0310519 A1 | 12/2012 | Lawlor et al. |

FOREIGN PATENT DOCUMENTS

| | | |
|---|---|---|
| DE | 9306989.8 | 7/1993 |
| DE | 4214223 | 11/1993 |
| DE | 4329983 | 3/1995 |
| DE | 29513369 | 12/1995 |
| DE | 19647200 | 1/1998 |
| DE | 29805142 | 6/1998 |
| DE | 19755008 | 7/1999 |
| DE | 10132982 | 1/2003 |
| DE | 10211444 | 10/2003 |
| DE | 10237554 | 3/2004 |
| DE | 10237607 | 3/2004 |
| DE | 10342837 | 4/2005 |
| DE | 102005002686 | 8/2006 |
| DE | 102005015973 | 10/2006 |
| DE | 102006039065 | 3/2007 |
| EP | 0461424 | 12/1991 |
| EP | 0667254 | 8/1995 |
| EP | 0928723 | 7/1999 |
| EP | 0969275 | 1/2000 |
| EP | 1103420 | 5/2001 |
| EP | 1376051 | 1/2004 |
| EP | 1389565 | 2/2004 |
| GB | 2210835 | 6/1989 |
| GB | 2316379 | 2/1998 |
| JP | 59029539 | 2/1984 |
| JP | 62043543 | 2/1987 |
| JP | 11131880 | 5/1999 |
| JP | 11254925 | 9/1999 |
| WO | WO9814974 | 4/1998 |
| WO | WO9914088 | 3/1999 |
| WO | WO9923828 | 5/1999 |

OTHER PUBLICATIONS

N.R. Lynam, "Electrochromic Automotive Day/Night Mirror," *SAE Technical Paper Series*, 870636 (1987).

N.R. Lynam, "Smart Windows for Automobiles," *SAE Technical Paper Series*, 900419 (1990).

N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

ACCESSORY SYSTEM FOR A VEHICLE

CROSS-REFERENCE TO RELATED APPLICATIONS

This application is a continuation of U.S. patent application Ser. No. 13/276,655, filed Oct. 19, 2011, now U.S. Pat. No. 8,362,885, which is a continuation of U.S. patent application Ser. No. 12/693,720, filed Jan. 26, 2010, now U.S. Pat. No. 8,044,777, which is a continuation of U.S. patent application Ser. No. 11/764,559, filed Jun. 18, 2007, now U.S. Pat. No. 7,679,488, which is a continuation of U.S. patent application Ser. No. 11/288,649, filed Nov. 29, 2005, now U.S. Pat. No. 7,233,230, which is a continuation of U.S. patent application Ser. No. 10/694,595, filed Oct. 27, 2003, now U.S. Pat. No. 6,970,073, which is a continuation of U.S. patent application Ser. No. 10/134,716, filed on Apr. 29, 2002, now U.S. Pat. No. 6,639,519, which is a continuation of U.S. patent application Ser. No. 09/820,013, filed on Mar. 28, 2001, now U.S. Pat. No. 6,396,408, which claims priority from United States provisional patent application Ser. No. 60/196,577, filed on Mar. 31, 2000, the disclosures of which are hereby incorporated herein by reference in their entireties.

BACKGROUND OF THE INVENTION

This invention relates generally to vehicle rearview mirror systems and, more particularly, to digital electrochromic rearview mirror systems.

Digital electrochromic mirror systems are described in commonly assigned U.S. Pat. Nos. 6,089,721 and 6,056,410, the disclosures of which are hereby incorporated herein by reference. Such systems are capable of controlling the reflectance level of an electrochromic element from the output of a microcomputer.

Various forms of vehicle communication systems have been developed including wired networks, or busses, operating one of several known protocols. These include a LIN (Local Interconnect Network), a LAN (Local Area Network), a CAN (Car or Controlled Area Network), and the like. An advantage of such vehicle networks is that the wire harness to the mirror can be minimized to as few as three wires or so, yet provide a variety of functions. Wireless communication networks utilizing radio frequency and/or infrared communication for vehicles have also been proposed, such as those utilizing the BLUETOOTH protocol. Such wireless communication and the BLUETOOTH protocol are described in more detail in commonly assigned U.S. patent application Ser. No. 09/793,002, filed Feb. 26, 2001, now U.S. Pat. No. 6,690,268, the disclosure of which is hereby incorporated herein by reference.

Trainable garage door openers, such as a universal garage door opener available from Johnson Controls/Prince Corporation, Holland, Mich. under the trade name HOMELINK™, include a transmitter for a universal home access system, which replaces the switch in a household garage door opener that opens/closes the garage door. A garage door opener communicating with a smart switch that is programmable to a household specific code that is of the rolling code type, such as is available from TRW Automotive, Farmington Hills, Mich. under the trade name KWIKLINK™, is known to be mounted within vehicles. As described in commonly assigned U.S. Pat. No. 6,172,613, the disclosure of which is hereby incorporated herein by reference, the universal garage door opener HOMELINK™ unit or the universal home access KWIKLINK™ unit may be mounted at, within, or on an interior rearview mirror assembly. The KWIKLINK™ system is a low-current device that can, optionally, be operated off of a battery source, such as a long-life lithium battery. It is also compact and lightweight as executed on a single- or double-sided printed circuit board.

SUMMARY OF THE INVENTION

The present invention provides a new and unique combination of a digital electrochromic mirror system, a vehicle accessory and a vehicle network, and, more particularly, a combination of a digital electrochromic mirror system, a garage door opener and a vehicle network. According to an aspect of the invention, a vehicular rearview mirror system includes a digital electrochromic mirror system having a digital drive circuit and an electrochromic reflective element. The reflective element assumes a partial reflectance level in response to a drive signal. The drive circuit provides a drive signal to the reflectance element. The mirror system further includes a garage door opener including a transmitter and a logic circuit. The logic circuit supplies signals to the transmitter for transmitting garage door opening signals. The mirror system further includes a microcontroller which defines, at least in part, the digital drive circuit and the logic circuit. In this manner, the digital electrochromic mirror system has components in common with the garage door opener. According to this aspect of the invention, the microcontroller communicates over a vehicle network with at least a module performing at least one other vehicle function. The vehicle network may have at least wired network connections and may further have wireless connections. The vehicle network may have a protocol selected from the group consisting of a LIN, a CAN, or a LAN.

According to this aspect of the invention, the digital drive circuit and the logic circuit may be mounted on a common circuit board. Power to the digital drive circuit and logic circuit may be supplied from a battery, preferably a rechargeable battery, that is separate from the vehicle ignition. The battery may be charged from a solar power system.

According to another aspect of the invention, a vehicle rearview mirror system includes an interior rearview mirror system made up of an electrochromic reflective element, a housing for the electrochromic reflective element and a circuit board in the housing. The electrochromic reflective element assumes a partial reflectance level in response to a drive signal. A digital electrochromic drive circuit is provided on the circuit board and supplies a drive signal to the reflective element. The mirror system further includes a garage door opener. The garage door opener includes a transmitter and a logic circuit, at least one of which (and preferably, both) is on the circuit board, and share components with, the electrochromic drive circuit. The logic circuit supplies signals to the transmitter for transmitting garage door opening signals. The garage door opener may, optionally and preferably, also serve as a receiver or a transceiver for a tire pressure status monitoring/display system, such as disclosed in commonly assigned U.S. patent application Ser. No. 09/513,941, filed Feb. 28, 2000, now U.S. Pat. No. 6,294,989, and U.S. patent application Ser. No. 09/710,016, filed Nov. 10, 2000, now U.S. Pat. No. 6,445,287, the disclosures of which are hereby incorporated herein by reference, and thus have a dual tire pressure monitoring/display and garage door opener function. The mirror system further includes a microcontroller which defines, at least in part, the digital drive circuit and the logic circuit. The digital electrochromic mirror system has components in common with the garage door opener. The microcontroller communicates over a vehicle network with at least one module performing at least one other vehicle function.

These and other objects, advantages and features of this invention will become apparent upon review of the following specification in conjunction with the drawings.

DESCRIPTION OF THE PREFERRED EMBODIMENT

Figure 1:
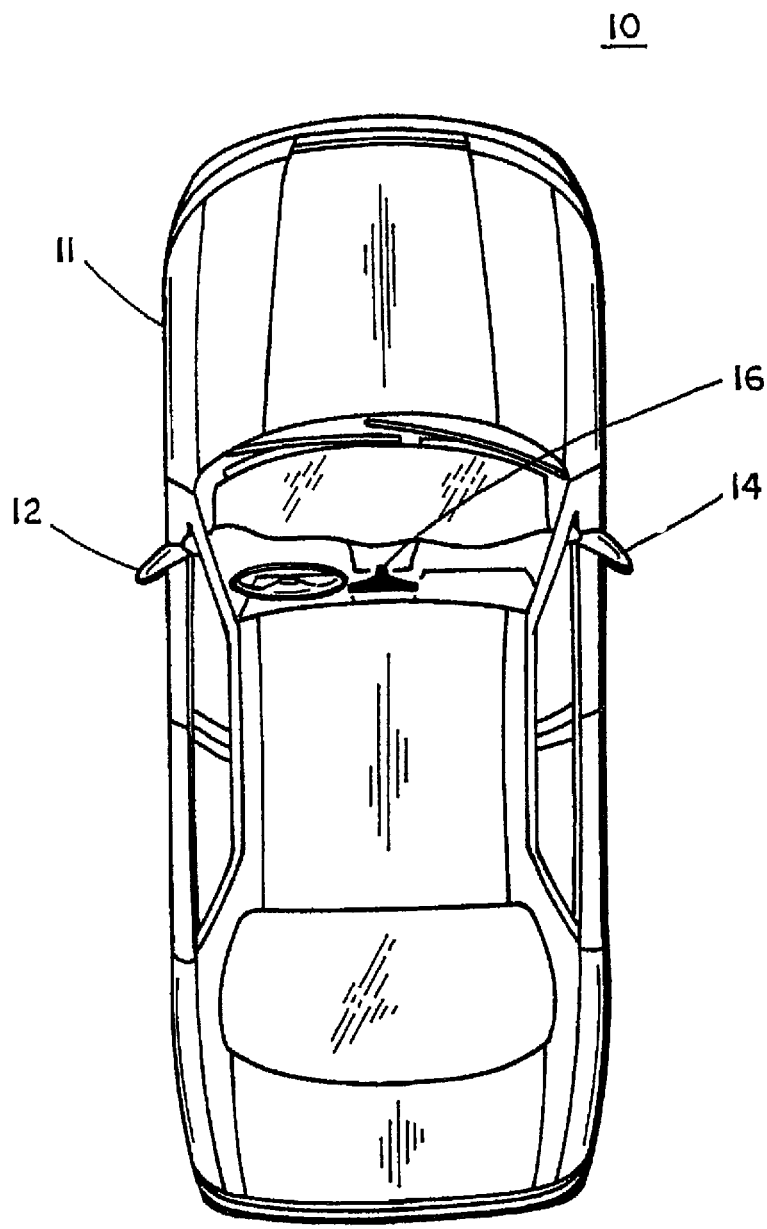
FIG. 1 is a top plan view of a vehicle having a vehicular rearview mirror system, according to the invention.
Figure 2:
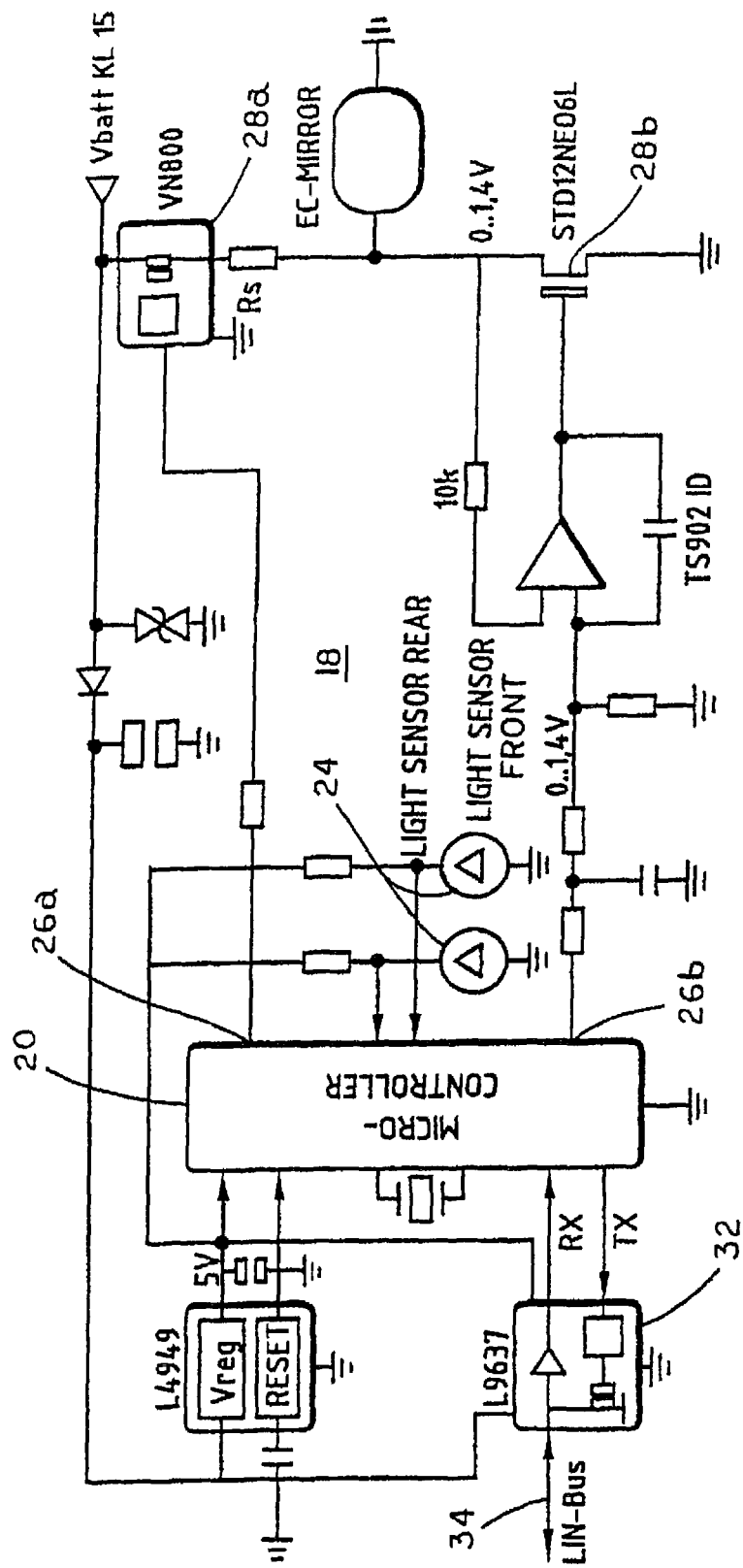
FIG. 2 is an electronic block diagram of a digital electrochromic mirror system, according to the invention.

Referring now specifically to the drawings, and the illustrative embodiments depicted therein, a vehicular rearview mirror system 10 is illustrated with a vehicle 11 and includes an interior rearview mirror assembly 16 and one or more exterior rearview mirror assemblies, such as driver side exterior rearview mirror assembly 12 and/or passenger side exterior rearview mirror assembly 14 (FIG. 1). Interior rearview mirror assembly 16 includes a digital electrochromic mirror system 18 which is preferably supplied according to the principles disclosed in commonly assigned U.S. Pat. Nos. 6,089,721 and 6,056,410, the disclosures of which are hereby incorporated herein by reference. Although the particulars of the invention are illustrated with an interior rearview mirror assembly 16, it should be understood that the principles of the invention could be equally applied to either or both exterior rearview mirror assemblies 12, 14.

Digital electrochromic mirror system 18 includes a microcontroller 20 and an electrochromic mirror reflective element 22. As is disclosed in the '721 and '410 patents, microcontroller 20 receives inputs from light sensors 24 (preferably phototransistors or photodiodes) and supplies digital outputs 26a, 26b which control solid-state switches 28a, 28b in order to provide a drive signal at 30 thereby establishing a partial reflectance level of electrochromic reflective element 22. Microcontroller 20 includes a microprocessor.

Figure 3:
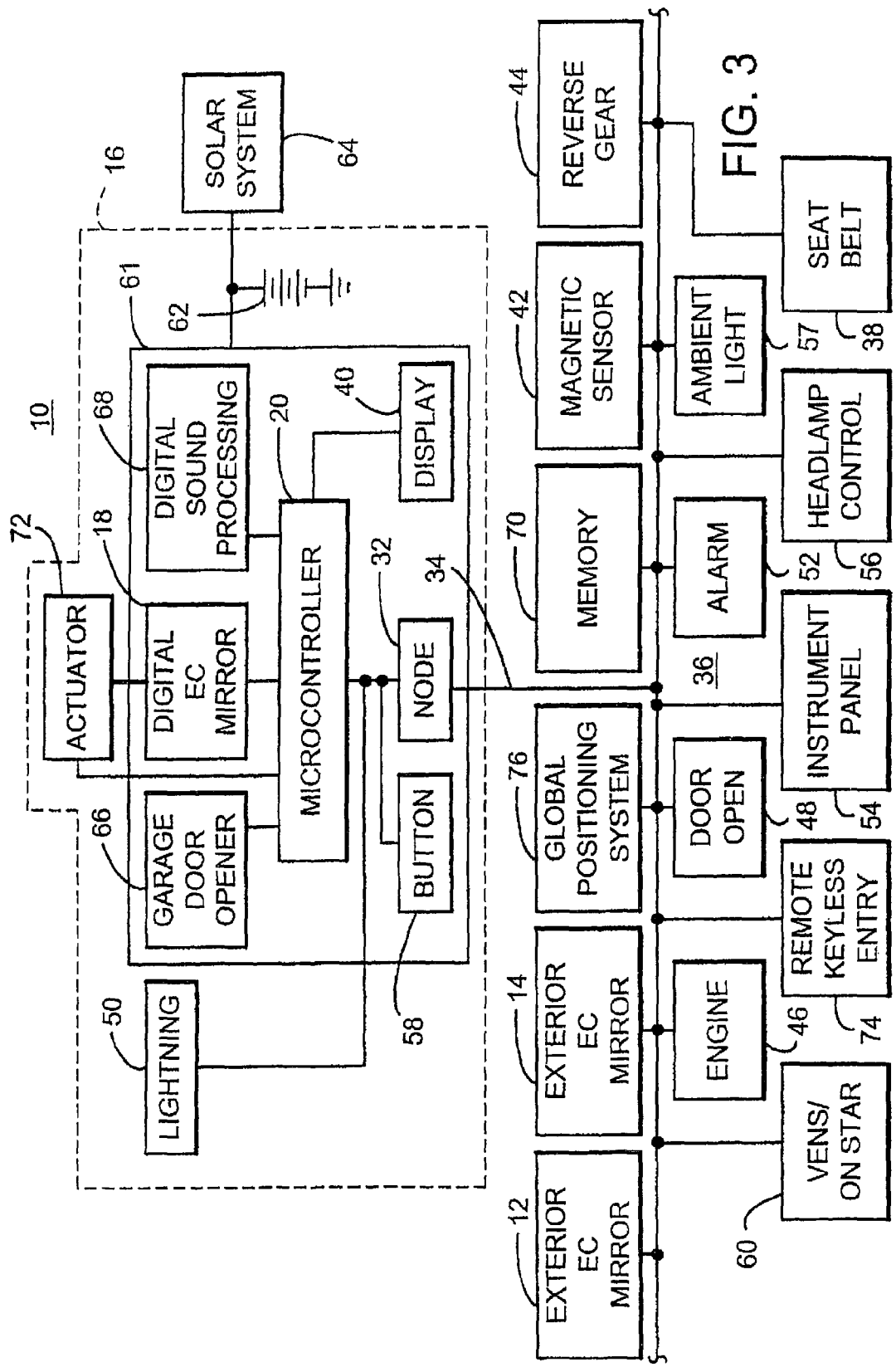
FIG. 3 is an electronic block diagram of a vehicular rearview mirror system, according to the invention.

Digital electrochromic mirror system 18 further includes a bus interface 32 which interfaces with a vehicle network, or bus, 34. Items on network 34 can be connected by wired or wireless connection. Wired connection may include wire, cables, fiber-optic cables, and the like. Wireless connection can be by infrared (IR) or radio-frequency (RF) communication, and, preferably, may be a short-range RF interconnection using the BLUETOOTH protocol. Vehicle network, or bus, 34 may utilize various buss protocols including a Local Internet Network (LIN), a Local Area Network (LAN), a Car (a/k/a Controlled) Area Network (CAN), or other vehicle network protocol. The BLUETOOTH protocol is a low-cost, low-power radio-based cable replacement or wireless link based on short-range radio-based technology. BLUETOOTH enables creation of a short-range (typically 30 feet or so, although longer and shorter ranges are possible), wireless personal area network via small radio transmitters built into various devices. For example, transmission can be on a 2.45 gigahertz band, moving data at about 721 kilobits per second, or faster. In the illustrated embodiment, network 34 is a multidrop bus which requires three or fewer wires for communication between a plurality of other vehicle functions 36, as illustrated in FIG. 3. In situations where timing and power consumption system constraints may cause network 34 wakeup time to be too slow for an automobile maker system response requirement, suitable adjustments may be made in the architecture of network 34. The network may be configured as disclosed in commonly assigned U.S. patent application Ser. No. 09/341,450 filed Jul. 8, 1999, now U.S. Pat. No. 6,291,905, the disclosure of which is hereby incorporated herein by reference.

Other vehicle functions 36 include, by way of example, a seatbelt warning status 38, which status may be displayed on a mirror-based display 40. Preferably, mirror-based display 40 may be located on, at or adjacent interior rearview mirror assembly 16. Mirror-based display 40 may be of various forms including that disclosed in commonly assigned U.S. patent application Ser. No. 09/799,414, filed on Mar. 5, 2001, now U.S. Pat. No. 6,477,464, the disclosure of which is hereby incorporated herein by reference. Additionally, display 40 may display magnetic vehicle heading information from a magnetic sensor 42, the information being supplied over network 34. Additionally, reverse gear status from a reverse gear sensor 44 may be supplied over network 34 to cause digital electrochromic mirror 18 to assume a high reflectance level when vehicle 11 is placed in reverse gear. Rearview mirror system 10 may additionally receive engine information 46 and/or door opener information at 48 over network 34 and activate general lighting 50 located in, at or on interior rearview mirror assembly 16, such as when a door of vehicle 11 is opened. Status from an alarm assembly 52 may also be conveyed over network 34 and displayed by display 40.

Dim ratios, or partial reflectance levels developed from light sensors 24, can be transmitted over network 34 for use to drive exterior mirrors 12, 14. Optionally, a dim ratio or partial reflectance level chosen for a driver-side exterior mirror may be different from (and typically greater than) a dim ratio or partial reflectance level chosen for a passenger-side exterior mirror, and both may be different from a dim ratio or partial reflectance level chosen for a interior electrochromic mirror. Ambient light information, sensed by an ambient light sensor 57, can also be transmitted over network 34 for use in dimming of instrument panel 54 or automatic headlight functions 56. Alternatively, ambient light information can be developed by interior rearview mirror assembly 16 as disclosed in commonly assigned U.S. Pat. No. 5,715,093, the disclosure of which is hereby incorporated herein by reference.

The interior rearview mirror assembly includes microcontroller 20 and a printed circuit board 61, that are common to both the digital electrochromic mirror system 18 and garage door opener function 66. Sharing of components and circuit board space can facilitate a reduction of susceptibility to RF/EMI interference and reduce cost and avoid duplication of both the network interface hardware 32, communication software and some processing power. The interior rearview mirror assembly may also include a video display system, such as disclosed in commonly assigned U.S. patent application Ser. No. 09/793,002, filed Feb. 26, 2001, now U.S. Pat. No. 6,690,268, the disclosure of which is hereby incorporated herein by reference. Components may be shared between the video display system, the digital electrochromic mirror system and/or the garage door opener. Additionally, microcontroller 20 may control a forward-facing camera system and headlight control which may also share components with the digital electrochromic mirror system and/or the garage door opener. Such forward-facing camera system and headlight control may be of the type disclosed in commonly assigned U.S. Pat. No. 5,796,094, the disclosure of which is hereby incorporated herein by reference. An imaging sensor based rain sensor of the type disclosed in commonly assigned U.S. patent application Ser. No. 09/530,306, filed Apr. 27, 2000, now U.S. Pat. No. 6,353,392, may also be incorporated in circuit board 61 and share components with the digital electrochromic mirror system and/or the garage door opener.

With microcomputer 20 driving digital electrochromic mirror system 18, and with vehicle status information available over network 34, it is possible to have a circuit assembly 61 in or at interior rearview mirror assembly 16 that is powered by a battery 62 that is separate from the vehicle ignition storage battery. As an example, battery 62 may be of a long-life lithium type battery. Moreover, because of its relatively small size, battery 62 may be recharged by a separate dedicated solar-powered rechargeable battery source 64 of the type described in commonly assigned patent application Ser. No. 09/793,002, filed Feb. 26, 2001, now U.S. Pat. No. 6,690,268, the disclosure of which is hereby incorporated herein by reference. By powering mirror system 10 by a separate-dedicated solar-powered rechargeable battery source, mirror system 10 can consume power from its dedicated/local battery source, and any power used up during nighttime hours can be replenished by day via solar cell/panel that is a part of battery charger 64 and is connected to the dedicated battery 62 so as to recharge/charge during daytime hours. Furthermore, microcomputer 20 can be put into various power-saving modes thereby enabling electronic assembly 61 to be used for control of a garage door opener 66, such as a HOMELINK™unit or the universal home access KWIKLINK™ unit.

Also, a mirror-mounted microphone/digital sound-processing system 68, as disclosed in commonly assigned patent application Ser. No. 09/466,010, filed Dec. 17, 1999, now U.S. Pat. No. 6,420,975, the disclosure of which is hereby incorporated herein by reference, may be also powered by battery 62. Preferably, sound-processing system 68 is incorporated in circuit assembly 61 and, most preferably, shares microcontroller 20 with garage door opener 66 and digital electrochromic mirror 18. Communication button press information 58 can be transmitted over network 34 for various uses by other electronic control units, such as activation of a rescue system 60, such as General Motors' ONSTAR™ system, a Ford Motor Company's RESCU™ system, or the like. Use of digital signal-processing and a single mirror-mounted microphone (such as is described in U.S. patent application Ser. No. 09/396,179, filed Sep. 14, 1999, now U.S. Pat. No. 6,278,377, the disclosure of which is incorporated by reference herein) is particularly advantageous for economical achievement of clear and error-free transmission from the vehicle, while operating along a highway, to a remote receiver, particularly in speech-recognition mode. This use of network 34 facilitates location of button 58 in interior mirror assembly 16.

Microcomputer 20 may receive memory information 70 over network 34 and actuate an actuator 72 to position reflective element 24. Principles, disclosed in commonly assigned U.S. Pat. No. 5,796,176, the disclosure of which is hereby incorporated herein by reference, may be utilized for communicating such memory information over network 34.

Microcomputer 20 may also use network 34 to measure values of light sensed by light sensors 24, supply drive signals to the electrochromic reflective element, and the like, on the network 34. Partial reflectance levels may be communicated to exterior rearview mirror assemblies 12, 24 over network 34. In this manner, if the interior digital electrochromic mirror system 18 develops a fault, incorrect information will not be transmitted to exterior rearview mirror systems. This also allows exterior reflective elements to have different peak voltages and provides more precise control over each of the mirror assemblies 12, 14, 16.

Other functions may be controlled over network 34 such as remote keyless entry 74 and global positioning system information/navigational system as described in commonly assigned co-pending application Ser. No. 09/799,414, filed on Mar. 5, 2001, now U.S. Pat. No. 6,477,464, the disclosure of which is hereby incorporated herein by reference.

In addition to placement at, on or in exterior rearview mirror assembly 18, circuit board 61 may be positioned at a location (and preferably in a housing) separate from interior mirror assemblies, such as disclosed in commonly assigned U.S. Pat. No. 6,099,131, the disclosure of which is hereby incorporated herein by reference.

Also, the concepts of the present invention provides a new and unique combination of a digital electrochromic mirror system, a vehicle accessory and a vehicle network when the vehicle accessory comprises a tire pressure monitoring/display system.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An accessory system for a vehicle, said accessory system comprising:
   an accessory disposed at and behind a windshield of a vehicle equipped with said accessory system;
   wherein said accessory comprises a forward facing camera, said forward facing camera viewing through the windshield of the equipped vehicle;
   a control;
   wherein said control comprises digital circuitry and a microcontroller;
   wherein said microcontroller controls at least one of (i) said forward facing camera, (ii) an actuator of the equipped vehicle, (iii) a garage door opener of the equipped vehicle, (iv) an electro-optic rearview mirror assembly of the equipped vehicle, (v) a digital sound processor of the equipped vehicle, (vi) a display of the equipped vehicle and (vii) lighting of the equipped vehicle;
   wherein said control is operable to at least one of send data to and receive data from at least one other accessory or system of the equipped vehicle via a vehicle network of the equipped vehicle; and
   wherein said at least one other accessory or system of the equipped vehicle comprises at least one of (i) an electro-optic exterior rearview mirror assembly, (ii) an antenna, (iii) a memory system, (iv) a sensor, (v) an alarm, (vi) a controller, (vii) a transmitter, (viii) a garage door opener and (ix) a mechanical system.

2. The accessory system of claim 1, wherein said at least one other accessory or system of the equipped vehicle comprises an antenna.

3. The accessory system of claim 2, wherein said antenna is part of a global positioning system.

4. The accessory system of claim 1, wherein said at least one other accessory or system of the equipped vehicle comprises a sensor.

5. The accessory system of claim 4, wherein said sensor comprises a magnetic sensor.

6. The accessory system of claim 1, wherein said at least one other accessory or system of the equipped vehicle comprises a controller.

7. The accessory system of claim 6, wherein said controller comprise a headlamp controller.

8. The accessory system of claim 1, wherein said at least one other accessory or system of the equipped vehicle comprises a mechanical system.

9. The accessory system of claim 8, wherein said mechanical system comprises a reverse gear selector.

10. The accessory system of claim 1, wherein said at least one other accessory or system of the equipped vehicle comprises a transmitter.

11. The accessory system of claim 10, wherein said transmitter comprises a transmitter of a garage door opener.

12. The accessory system of claim 1, wherein said accessory comprises said control and wherein said microcontroller controls an electro-optic interior rearview mirror assembly comprising an interior electrochromic reflective element, said interior electrochromic reflective element assuming an interior mirror partial reflectance level in response to an interior mirror electrochromic reflective element drive signal, and wherein said microcontroller controls said interior mirror electrochromic reflective element drive signal.

13. The accessory system of claim 12, wherein said control at least one of sends data via said vehicle network to and receives data via said vehicle network from an electro-optic exterior rearview mirror assembly that includes an exterior electrochromic reflective element that assumes an exterior mirror partial reflectance level in response to an exterior mirror electrochromic reflective element drive signal, and wherein said control controls said exterior mirror partial reflectance level of said exterior electrochromic reflective element over said vehicle network.

14. The accessory system of claim 13, wherein said interior mirror partial reflectance level of said interior electrochromic reflective element assumed in response to said interior mirror electrochromic reflective element drive signal differs from said exterior mirror partial reflectance level of said exterior electrochromic reflective element assumed in response to said exterior mirror electrochromic reflective element drive signal.

15. The accessory system of claim 12, wherein said electro-optic electro-optic interior rearview mirror assembly includes at least one of a garage door opener and said forward-facing camera.

16. The accessory system of claim 12, wherein said electro-optic interior rearview mirror assembly includes a user control, actuation of which is transmitted over said vehicle network.

17. The accessory system of claim 16, wherein said user control comprises a user-operable button.

18. The accessory system of claim 1, wherein said vehicle network comprises at least one wired connection.

19. The accessory system of claim 18, wherein said vehicle network comprises a protocol selected from the group consisting of a LIN, a CAN and a LAN.

20. The accessory system of claim 19, wherein communication of data via said vehicle network comprises communication by at least one of a wire, a cable and a fiber-optic connection.

21. The accessory system of claim 1, wherein said vehicle network at least partially comprises a wireless network.

22. The accessory system of claim 21, wherein said wireless network comprises a short-range wireless connection.

23. The accessory system of claim 22, wherein said wireless network comprises a BLUETOOTH protocol.

24. The accessory system of claim 21, wherein said wireless network comprises at least one of an infrared and a radio-frequency connection.

25. The accessory system of claim 1, wherein said microcontroller comprises a microprocessor.

26. The accessory system of claim 1, wherein said vehicle network comprises at least a wired connection comprising no more than three wires.

27. The accessory system of claim 1, wherein said forward facing camera and at least one other accessory share components.

28. The accessory system of claim 27, wherein said digital circuitry shares at least one component with at least one of (i) a headlight control of the equipped vehicle, (ii) an electrochromic mirror system of the equipped vehicle and (iii) a garage door opener of the equipped vehicle.

29. The accessory system of claim 1, wherein said accessory comprises said control.

30. An accessory system for a vehicle, said accessory system comprising:
an accessory disposed at and behind a windshield of a vehicle equipped with said accessory system;
wherein said accessory comprises a forward facing camera, said forward facing camera viewing through the windshield of the equipped vehicle;
a control;
wherein said control comprises digital circuitry and a microprocessor;
wherein said control controls at least said forward facing camera;
wherein said control at least one of sends data to at least one other accessory or system of the equipped vehicle via a vehicle network of the equipped vehicle and receives data from at least one other accessory or system of the equipped vehicle via said vehicle network of the equipped vehicle;
wherein said vehicle network comprises a protocol selected from the group consisting of a LIN, a CAN and a LAN; and
wherein communication of data via said vehicle network comprises communication by at least one of a wire, a cable and a fiber-optic connection.

31. The accessory system of claim 30, wherein said at least one other accessory or system of the equipped vehicle comprises at least one of (i) an electro-optic exterior rearview mirror assembly, (ii) an antenna, (iii) a memory system, (iv) a sensor, (v) an alarm, (vi) a controller, (vii) a transmitter, (viii) a garage door opener and (ix) a mechanical system.

32. The accessory system of claim 30, wherein said accessory comprises said control and wherein said control controls at least one of (i) an actuator of the equipped vehicle, (ii) a garage door opener of the equipped vehicle, (iii) an electro-optic rearview mirror assembly of the equipped vehicle, (iv) a digital sound processor of the equipped vehicle, (v) a display of the equipped vehicle and (vi) lighting of the equipped vehicle.

33. The accessory system of claim 30, wherein said vehicle network comprises at least a wired connection comprising no more than three wires.

34. The accessory system of claim 30, wherein said forward facing camera and at least one other accessory share components.

35. The accessory system of claim 34, wherein said forward facing camera shares at least one component with at least one of (i) a headlight control of the equipped vehicle, (ii) an electrochromic mirror system of the equipped vehicle and (iii) a garage door opener of the equipped vehicle.

36. The accessory system of claim 30, wherein said accessory comprises said control.

37. An accessory system for a vehicle, said accessory system comprising:

an accessory disposed at and behind a windshield of a vehicle equipped with said accessory system;
wherein said accessory comprises a forward facing camera, said forward facing camera viewing through the windshield of the equipped vehicle;
a control;
wherein said control comprises digital circuitry and a microprocessor;
wherein said control controls at least said forward facing camera;
wherein said control at least one of sends data to at least one other accessory or system of the equipped vehicle via a vehicle network of the equipped vehicle and receives data from at least one other accessory or system of the equipped vehicle via said vehicle network of the equipped vehicle; and
wherein said forward facing camera and at least one other accessory share components.

38. The accessory system of claim 37, wherein said vehicle network comprises a protocol selected from the group consisting of a LIN, a CAN and a LAN.

39. The accessory system of claim 37, wherein communication of data via said vehicle network comprises communication by at least one of a wire, a cable and a fiber-optic connection.

40. The accessory system of claim 37, wherein said at least one other accessory or system of the equipped vehicle comprises at least one of (i) an electro-optic exterior rearview mirror assembly, (ii) an antenna, (iii) a memory system, (iv) a sensor, (v) an alarm, (vi) a controller, (vii) a transmitter, (viii) a garage door opener and (ix) a mechanical system.

41. The accessory system of claim 37, wherein said accessory comprises said control and wherein said control controls at least one of (i) an actuator of the equipped vehicle, (ii) a garage door opener of the equipped vehicle, (iii) an electro-optic rearview mirror assembly of the equipped vehicle, (iv) a digital sound processor of the equipped vehicle, (v) a display of the equipped vehicle and (vi) lighting of the equipped vehicle.

42. The accessory system of claim 37, wherein said vehicle network comprises at least a wired connection comprising no more than three wires.

43. The accessory system of claim 37, wherein said forward facing camera shares at least one component with at least one of (i) a headlight control of the equipped vehicle, (ii) an electrochromic mirror system of the equipped vehicle and (iii) a garage door opener of the equipped vehicle.

44. The accessory system of claim 37, wherein said accessory comprises said control.

* * * * *